Figure 6:
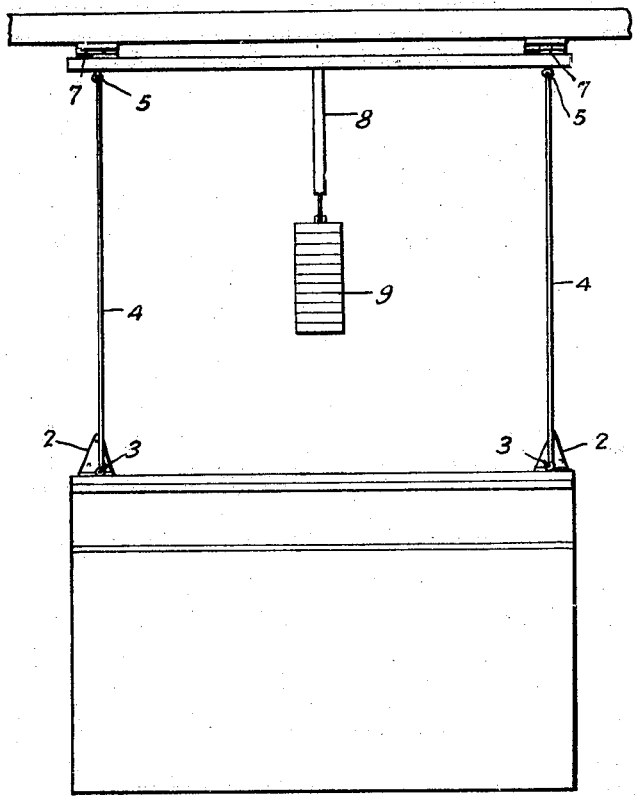

May 20, 1930.　　　　　L. HART　　　　　1,759,352
POULTRY FEEDER
Filed April 4, 1927　　　3 Sheets-Sheet 1
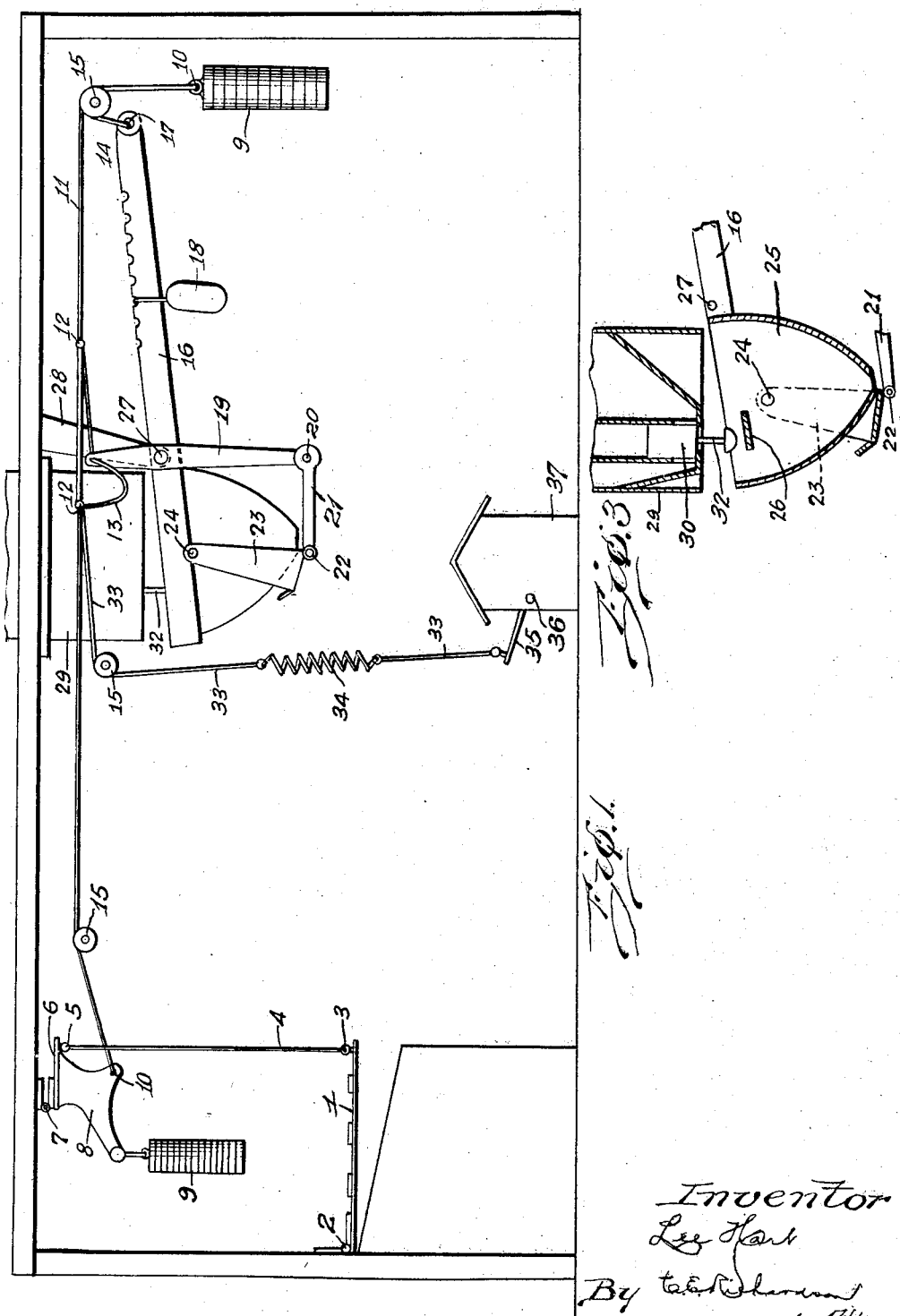
Inventor
Lee Hart
By [signature]
Atty.

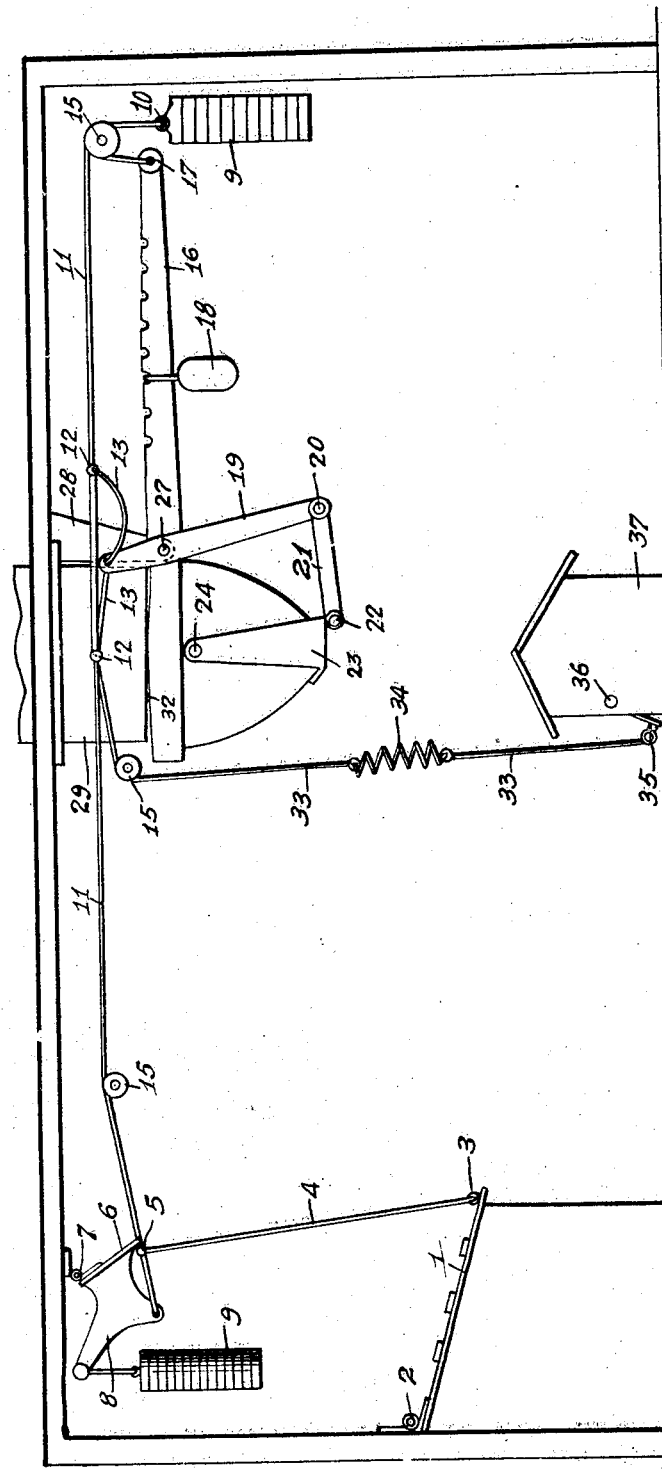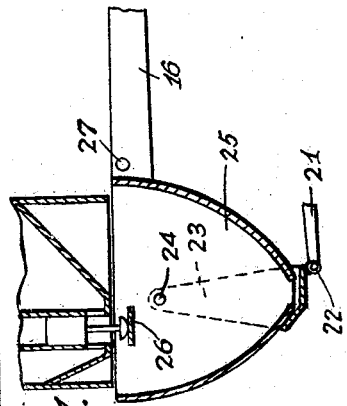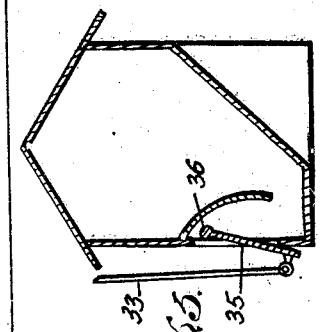

Patented May 20, 1930

1,759,352

UNITED STATES PATENT OFFICE

LEE HART, OF INDEPENDENCE, MISSOURI

POULTRY FEEDER

Application filed April 4, 1927. Serial No. 180,785.

This invention relates to poultry roosts and feeders, and especially to that type in which the feeding is made substantially automatic.

The principal objects are to provide a means whereby the weight of fowls on the roost at night closes certain sources of food supply, measures out a modicum of grain for the next day, and whereby their leaving the roost in the morning opens the same sources of food supply and broadcasts said modicum of grain.

In the drawings, Figure 1 is a side view of the numerous elements herein described, when the roost is empty, as in the daytime when access to the food supplies is open; Figure 2 shows the same, but at night, when roost is loaded down, food supplies are cut off and the modicum of grain is in process of being measured out for the morning; Figure 3 is a sectional detail of the grain-hopper in the day, or open position; Figure 4 is the same, in the night position; Figure 5 is a sectional detail of the dry-mash receptacle while closed for the night and Figure 6 is a front view of the roost and its supports, in the day.

I have provided a roost 1, the frame of which is hingedly connected 2, at one edge with an interior wall of a poultry house, the opposite edge of the roost frame is supported at the corners 3, by cables 4, to the corners 5, of one edge of a wood board 6, of approximately the same length as the roost frame; said wood board is hingedly connected 7, at the corners of edge opposite to that upon which cables are connected, to the ceiling of the poultry house. In the center of one surface of said wood board and at right angles thereto, I have placed a bell-hanger crank 8, with a counter poise having a sectional weight 9, adjustable to approximate the weight needed to keep the roost in a raised position when not in use by at least one half of the flock for which it has been constructed. The surface of aforementioned wood board 6, which is opposite to that upon which bell-hanger crank 8, is placed, rests against the ceiling of the poultry house when roost is not in use (being held in that position by the sectional weight 9, on the counter poise of the bell-hanger crank 8, thereby preventing any small portion of the flock which may alight upon the roost during the day from lowering same). The relative positions of cable and hinge connections 5 and 7, at ends of wood board 6, and that of the bell-hanger crank 8, permit of the wood board 6, serving as a semi-flexible beam capable of reflex action and of conveying force caused by weight of fowls upon the roost frame 1, to the bell-hanger crank 8 without subjecting it to excessive shock due to erratic movement of fowls to and from the roost.

From said bell-hanger crank 8, a cable 11, extends in any desired direction by means of pulleys 15, to a sectional weight 10, adjustable to approximate the weight needed to keep the cable 11 taut. In cooperation with said cable 11, and connected therewith by a cord 14, is a scale beam 16, provided with a slidable poise 18, and at the end opposite to the sectional weight 10, said scale beam supports a grain-hopper 25, provided with a crank-lever 19, a lever-link 21, a grain shutter 23, and a valve support (or tripper) 26; said crank-lever 19, being also connected with aforesaid cable 11, by an auxiliary cable 13, and all being so disposed that when the sectional weights 9 and 10, are raised by the avoirdupois of the flock on the roost 1, the grain-hopper 25, is automatically raised, its shutter 23, closed, the valve support (or tripper) 26, contacts with and raises the grain valve 30, and a predetermined modicum of grain (regulated by the poise 18 on the scale-beam 16,) is allowed to flow thru the outlet 31, and into the grain-hopper 25; the weight of the grain causing the grain-hopper 25, to lower slightly and the grain-valve 30, to settle (or fall) into a closed position. The departure of the flock from the roost 1, in the morning causes a substantial reversal of the operations just described; for this effectuates the lowering of the weights 9 and 10, the pulling of the cables 11, 13, 14 and 33, the holding up of the scale end of scale-beam 16, the opening of the shutter 23, allowing the grain to fall from the grain-hopper 25, as well as the opening of the door to the dry-mash container 37. The dry-mash container 37 is a house like structure, placed on the floor below the grain-hopper 25, and having a removable roof for convenience in filling, and which serves to spread the grain which falls upon it and to scatter same, an auxiliary cable 33 is attached to the cable 11 and, by use of a modifying spring 34, operates to raise and to allow the lowering of one edge of a flap-door 35, which is pivoted at the opposite edge 36, to the dry-mash container 37. By this means the poultry have access to the mash feed thruout the day and at night the mash feed is made secure against rats and mice.

The preferred form of the elements is shown, but I am not restricted to their use, for any equivalent or possible substitution is contemplated, as well as the types shown; and any deviation from the latter comes within the principles and scope of my invention.

I claim:

1. A poultry roost comprising a roost frame, one edge of which is hingedly attached to an interior wall of a poultry house, the opposite edge capable of being lowered by the weight of the flock thereon at night and of automatically rising when said weight is removed, said free edge of roost frame being supported at the corners by means of cables to corresponding corners of a tilting beam hingedly attached to the ceiling of said poultry house, said tilting beam having a bell-hanger crank provided with a counterpoise, attached at right angles, on the under side and preferably near the center in such a manner that when the flock alights upon the roost the lowering of that edge of the tilting beam to which the free edge of the roost frame is supported will result in a gradual swinging backward of said bell-hanger crank and the removal of the flock from the roost will result in a corresponding swinging forward of said bell-hanger crank, the said lowering and rising of one edge of roost being capable of utilization by means of a cable leading from said bell-hanger crank, by means of pulleys, to any appliance without regard to its relative position or location from the roost and thereby being applicable to poultry houses of widely different types of construction.

2. A poultry feeder comprising a fowl roost capable of being lowered by the weight of fowls thereon, partly supported by cables to a beam provided with a bell-hanger crank with counterpoise, a main cable leading therefrom terminating in a sectional weight, auxiliary cables cooperating with the aforementioned main cable and attached to an operating crank-lever, a receptacle containing grain provided with a valve which when raised allows the discharge of a modicum of said grain, a cable leading from said sectional weight, (by way of a pulley) to a scale-beam provided with a poise, to one end of which scale-beam is fastened below said grain receptacle, a hopper provided with a lever, shutter and valve support, by all of which means the depression caused by weight on said roost actuates the weights, closes the said hopper, allows said hopper to rise, causes the valve support to raise the valve permitting a predetermined quantity of grain to fall from said grain receptacle into said hopper; and whereby, also, the lightening of said roost causes said weights to lower, the cable to recede, the lever to open the shutter, the modicum of grain to be scattered on the floor, and the scale-beam to be held up.

3. A poultry feeder comprising a roost capable of being lowered by the weight of fowls thereon, partly supported by cables attached to a bell-hanger crank provided with a counterpoise, a cable leading therefrom terminating in a sectional weight, a dry-mash receptacle provided with a sloping side and bottom and a lift door in one side thereof, said door pivoted and hung in such manner and so connected by an auxiliary cable cooperating with the aforementioned main cable as to be capable of being closed by the said lowering of said roost and of being opened by the release and raising of said roost.

In testimony whereof I have hereto affixed my signature.

LEE HART.